No. 646,217.  
J. L. HOLLINGSWORTH.  
THERMAL TESTING TUBE.  
(Application filed Aug. 24, 1899.)  
Patented Mar. 27, 1900.
(No Model.)
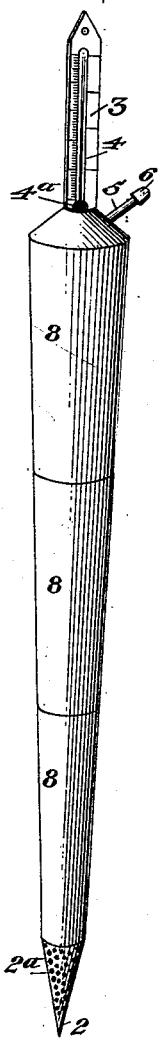
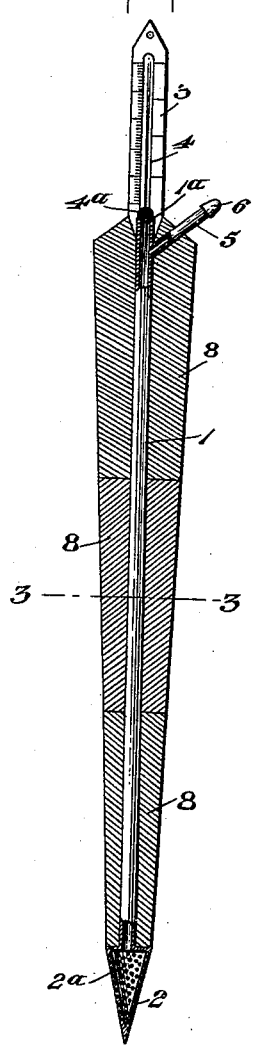
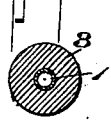
WITNESSES:  
H. G. Dieterich  
Louis Dieterich
INVENTOR  
J. L. Hollingsworth  
BY  
Fred G. Dieterich & Co.  
ATTORNEYS

UNITED STATES PATENT OFFICE.

JAMES L. HOLLINGSWORTH, OF NEWBERN, TENNESSEE.

THERMAL TESTING-TUBE.

SPECIFICATION forming part of Letters Patent No. 646,217, dated March 27, 1900.

Application filed August 24, 1899. Serial No. 728,313. (No model.)

*To all whom it may concern:*

Be it known that I, JAMES L. HOLLINGSWORTH, residing at Newbern, in the county of Dyer and State of Tennessee, have invented a new and Improved Thermal Testing-Tube, of which the following is a specification.

This invention is in the nature of an improved means for accurately taking the temperature of grain, cotton-seed, fruit, or other articles held in bulk in a storing-bin, elevator, car, or other holder, and it is particularly intended for use in connection with that class of storing bins, houses, or cars having ventilating means arranged to control or disseminate heat or cold air through the entire bulk or such parts of the said bulk as require treatment to cure damp, rot, or other conditions injurious to the article thus stored.

In storing houses or bins in which ventilating devices—such, for example, as disclosed in my copending application, Serial No. 728,709, filed August 28, 1899—are used it is necessary in the practical employment of the said ventilating means to ascertain at times the temperature of the bulk at different depths, so that the ventilating or drying process can be so controlled as to act upon such part or parts of the bulk in a manner that will add to the proper preservative condition.

In the practical application of a grain-bin ventilator and drying means such as disclosed in my copending application I have found the ordinary devices for gaging the heat condition of the bulk at different strata are not desirable, for the reason that in the insertion of the ordinary testing-tubes or thermometer the thermic results are more or less governed by the heat generated in the upper parts of the bulk through which the testing device or thermometer is inserted rather than by that particular part, stratum, or layer it is desired to test.

My invention therefore seeks to provide a very simple and inexpensive heat-testing device that can be conveniently employed for its desired purposes and which will effectively accomplish the desired results.

My invention comprehends an imperforated tube, of glass or other desired material, having at its lower end a perforated conical tapering inlet and its upper end made to receive the bulb of an ordinary thermometer, which has its supporting-body made fast to the tube, and surrounding the said tube from the exposed or thermometer-bulb end to its perforated inlet is a non-heat-conducting covering, such as asbestos, which covering is also made tapering, whereby the body proper of my improved device can be readily inserted into the bulk to be tested to the depth desired.

In its subordinate features my invention consists in certain details and combination of parts, all of which will be first described, and then pointed out in the appended claims, reference being had to the accompanying drawings, in which—

Figure 1 is a perspective view of my improvement. Fig. 2 is a vertical section of the same, and Fig. 3 is a horizontal section taken on the line 3 3 of Fig. 2.

In the practical construction of my invention the same consists of an imperforated tube 1, made of glass or other suitable material and of a suitable length. This tube 1 at the lower end has integrally formed therewith a perforated inlet member 2, made conical or pointed, as shown, whereby the same will readily penetrate into the grain or other bulk to be tested. The upper end of the tube 1 terminates in a concaved seat $1^a$ and has secured thereto the thermometer-frame 3, upon which is mounted a thermometer-glass 4, of any ordinary construction, the bulb $4^a$ of which is held in the seat $1^a$ of the tube 1.

At a point near the bulb-holding end of the tube 1 said tube has a lateral 5, having a detachable closure-cap 6, the purpose of said lateral being to allow for the escape of air within the tube $1^a$ under certain conditions and also for the entrance of atmospheric air for a purpose presently explained.

8 8 indicate a series of incasing portions which are fitted about the stem $1^a$ and extend from the bulb portion of the thermometer down to the perforated inlet $2^a$. The sections 8 may be as many as desired, and all of the said sections are formed of a non-heat-conducting material—such as asbestos, for example—and the several sections 8 are joined and so formed as to provide a gradually-tapering solid body which entirely incloses the internal tube $1^a$.

While I have described and shown the inlet 2ᵃ as being made integral with the tube 1ᵃ, it is obvious that said inlet 2ᵃ may be detachably connected with the tube.

By constructing a testing-tube in the manner described it is obvious that when inserted into a body of grain or other material stored in bulk that generates a natural heat the heat volume surrounding the inlet end only will pass up in the tube 1ᵃ, and it will not be affected by the varying temperature of the different layers of grain or other articles which come in contact with the non-heat-conducting closure members 8.

In using my device it is customary to remove the closure member 6 to permit the escape of such air as may accumulate within the tube as the same is inserted through the several layers, thereby providing for the escape of the air that passes therein during the progress of inserting the test-tube to the depth desired, the lateral 5 also serving as a means for admitting atmospheric air to keep the thermometer to a condition that of the normal atmospheric temperature may cause it to fluctuate. After having set the device to the depth desired it is only necessary to close the lateral 5, it being obvious that the hot air entering the inlet 2ᵃ will not be diminished or increased in density as it rises by reason of the closure members 8 keeping off any of the heat of the bulk above contacting with the tube 1ᵃ. It will thus be seen that I can take any temperature of the grain or other bulk at any point desired, near the top, at the bottom, or at intermediate points, and secure accurate register of the temperature of the different strata of the said bulk.

Having thus described my invention, what I claim, and desire to secure by Letters Patent, is—

1. A device for the purposes described, comprising a tube having a perforated lower end, its upper end terminating in an outlet-seat; a thermometer secured to the said upper end having its bulb fitting the said seat, and a casing of non-heat-conducting material inclosing the tube at points between its inlet and outlet ends, all being arranged substantially as shown and described.

2. A new article for the purposes described, comprising a tube having an inlet at the lower end, an outlet at the upper end; a thermometer mounted upon said upper end and having its bulb fitting the seat of the outlet of the tube, said tube having a lateral at a point near its outlet end, said lateral having a closure member, all being arranged substantially as shown and described.

3. A device for the purposes described, comprising a tube having a tapering perforated inlet at the lower end, its upper end being open and having a seat; a thermometer having its bulb adapted to fit the said seat, said tube having a lateral communicating therewith at or near its outlet end, said lateral having a closure member, and a casing surrounding the tube formed of non-heat-conducting material, said casing being made tapering from the upper end downward and merging with the conical end of the tube, all being arranged substantially as shown and for the purposes described.

JAMES L. HOLLINGSWORTH.

Witnesses:
Mrs. J. L. HOLLINGSWORTH,
FRED G. DIETERICH.